(12) United States Patent
Moreno (10) Patent No.: US 7,797,841 B2
(45) Date of Patent: *Sep. 21, 2010

(54) DRIVE MECHANISM FOR A RECIPROCATING SAW

(75) Inventor: Jaime Moreno, Wheeling, IL (US)

(73) Assignee: Robert Bosch GmbH, Stuttgart (DE)

( * ) Notice: Subject to any disclaimer, the term of this patent is extended or adjusted under 35 U.S.C. 154(b) by 840 days.

This patent is subject to a terminal disclaimer.

(21) Appl. No.: 11/511,625

(22) Filed: Aug. 29, 2006

(65) Prior Publication Data

US 2008/0052923 A1 Mar. 6, 2008

(51) Int. Cl.
*B27B 3/26* (2006.01)

(52) U.S. Cl. .................................................... 30/392

(58) Field of Classification Search ............... 30/166.3, 30/392, 393, 394
See application file for complete search history.

(56) References Cited

U.S. PATENT DOCUMENTS

| | | | | |
|---|---|---|---|---|
| 2,824,455 A * | 2/1958 | Ristow et al. | ................. | 74/60 |
| 3,333,513 A | 8/1967 | Fritz | | |
| 3,461,732 A * | 8/1969 | Gregory | ........................ | 74/60 |
| 3,864,630 A * | 2/1975 | Ham | ..................... | 324/103 R |
| 3,945,120 A * | 3/1976 | Ritz | ........................... | 30/393 |
| 4,020,555 A * | 5/1977 | Hedrick | ....................... | 30/392 |
| 4,178,136 A * | 12/1979 | Reid et al. | ................. | 417/269 |
| 4,284,148 A * | 8/1981 | Wanner et al. | ............. | 173/109 |
| 4,397,220 A * | 8/1983 | Russo et al. | ................. | 91/408 |
| 4,537,264 A * | 8/1985 | Schmid et al. | ................ | 173/48 |
| 5,025,562 A * | 6/1991 | Palm | ......................... | 30/392 |
| 5,050,307 A | 9/1991 | Palm | | |
| 5,336,056 A * | 8/1994 | Kimura et al. | ........... | 417/222.1 |
| 5,392,519 A * | 2/1995 | Inoue et al. | ................. | 30/393 |
| 5,555,626 A * | 9/1996 | Fuchs | ......................... | 30/393 |
| 5,566,458 A * | 10/1996 | Bednar | ....................... | 30/392 |
| 5,782,000 A * | 7/1998 | Bednar | ....................... | 30/393 |
| 6,212,781 B1 | 4/2001 | Marinkovich et al. | | |
| 6,234,255 B1 * | 5/2001 | Feldmann et al. | .......... | 173/114 |
| 6,249,979 B1 | 6/2001 | Bednar et al. | | |

(Continued)

FOREIGN PATENT DOCUMENTS

EP 1593448 11/2005

(Continued)

*Primary Examiner*—Jason Daniel Prone
*Assistant Examiner*—Jennifer Swinney
(74) *Attorney, Agent, or Firm*—Greer, Burns & Crain, Ltd.

(57) ABSTRACT

Embodiments of a reciprocating drive apparatus are disclosed which comprise a housing, a drive shaft rotatably mounted in the housing, an elongated plunger mounted in the housing for reciprocating motion; the plunger having a rear end portion configured to engage a wobble plate interface structure and a front end portion for attaching a tool, a first bushing positioned in the housing for retaining the front end portion in a manner whereby the plunger is not restrained from rotating about a first axis of rotation, a second bushing positioned in the housing for receiving the rear end portion of the elongated plunger in a manner whereby the plunger is not restrained from rotating along a second axis of rotation as the plunger reciprocates in the bushing, a wobble plate assembly operatively connected to the drive shaft and having an elongated arm with a wobble plate interface structure for engaging the rear end portion of the plunger and reciprocating the plunger in the first and second bushings.

17 Claims, 8 Drawing Sheets

U.S. PATENT DOCUMENTS

| | | |
|---|---|---|
| 6,282,797 B1 | 9/2001 | Osada |
| 6,286,217 B1 * | 9/2001 | Dassoulas et al. ............. 30/392 |
| 6,508,151 B1 | 1/2003 | Neitzell |
| 6,634,107 B2 | 10/2003 | Osada |
| 6,662,455 B2 * | 12/2003 | Tachibana et al. ............. 30/393 |
| 6,688,005 B1 * | 2/2004 | Tachibana et al. ............. 30/392 |
| 6,758,119 B1 | 7/2004 | Neitzell |
| 6,772,662 B2 | 8/2004 | Marinkovich et al. |
| RE38,606 E | 10/2004 | Bednar et al. |
| 6,829,831 B1 | 12/2004 | Neitzell |
| 6,851,193 B2 | 2/2005 | Bednar et al. |
| 6,877,235 B2 | 4/2005 | Osada |
| 7,117,601 B2 * | 10/2006 | Hai-Chun ................... 30/392 |
| 7,127,973 B2 | 10/2006 | Neitzell et al. |
| 7,168,169 B2 * | 1/2007 | Moreno ....................... 30/394 |
| 7,448,137 B2 | 11/2008 | Neitzell et al. |
| 2001/0011420 A1 | 8/2001 | Osada |
| 2001/0034941 A1 | 11/2001 | Bednar et al. |
| 2003/0051352 A1 | 3/2003 | Clark, Jr. |
| 2005/0016001 A1 | 1/2005 | Griep et al. |
| 2005/0262710 A1 * | 12/2005 | Moreno ....................... 30/394 |
| 2008/0184569 A1 | 8/2008 | Moreno |

FOREIGN PATENT DOCUMENTS

| | | | |
|---|---|---|---|
| GB | 1189210 A | | 4/1970 |
| GB | 2165794 A | * | 4/1986 |
| GB | 2256905 A | | 6/1991 |
| GB | 2340438 A | | 7/1999 |
| GB | 2415661 A | | 5/2005 |
| WO | WO 00/47358 | | 8/2000 |

* cited by examiner

DRIVE MECHANISM FOR A RECIPROCATING SAW

BACKGROUND OF THE INVENTION

The present invention generally relates to power hand tools, and more particularly, to power reciprocating tools.

Reciprocating tools that are motor driven, such as saber saws, larger reciprocating saws and the like are usually driven by electric motors that have a rotating output shaft. The rotating motion must be translated into reciprocating motion for moving a saw blade or the like in a reciprocating manner. While various types of mechanisms have been known in the art for translating the rotation motion into reciprocating motion, one common type of motion conversation mechanism is known as a wobble plate drive. A wobble plate drive shaft is typically connected to the motor through a gear arrangement to reduce the speed of rotation of the motor output shaft and the wobble plate drive causes a wobble arm to reciprocate in a path that is parallel to the motion of the saw blade or the like. The blade of a reciprocating saw is mounted in a blade clamping mechanism that is located at the end of a plunger, the other end of which is operatively connected to a wobble arm.

In some prior art wobble plate drives, the plunger has a rectangular or square cross-section that is located in a rectangular or square opening to restrain the plunger from twisting which would undesirably affect the angular orientation of a blade attached to the drive. While these noncircular cross-section plungers operate in a desirable manner, the noncircular cross-section increases the cost relative to a tubular plunger construction which is more desirable. However, there is a tendency of wobble plate drives to exert forces on the plunger which tend to cause it to rotate. It is highly desirable to prevent such rotation using a cost effective design that operates in a highly efficient manner.

SUMMARY OF THE INVENTION

Embodiments of a reciprocating drive apparatus are disclosed which comprise a housing, a drive shaft rotatably mounted in the housing, an elongated plunger mounted in the housing for reciprocating motion; the plunger having a rear end portion configured to engage a wobble plate interface structure and a front end portion for attaching a tool, a first bushing positioned in the housing for retaining the front end portion in a manner whereby the plunger is not restrained from rotating about a first axis of rotation, a second bushing positioned in the housing for receiving the rear end portion of the elongated plunger in a manner whereby the plunger is not restrained from rotating along a second axis of rotation as the plunger reciprocates in the bushing, a wobble plate assembly operatively connected to the drive shaft and having an elongated arm with a wobble plate interface structure for engaging the rear end portion of the plunger and reciprocating the plunger in the first and second bushings.

An alternative embodiment has the first and second axes of rotation offset relative to one another.

DETAILED DESCRIPTION

The preferred embodiment of the present invention is shown in the drawings is a reciprocating saw, the general size and shape of which is similar to saws that are currently marketed. The present invention is also adapted for other types of tools such as saber saws, for example, or other types of tools that have a reciprocating action and are powered by a motor having a rotating output shaft. A patent application assigned to the same assignee as the present invention, entitled ANTI-ROTATION SYSTEM FOR A RECIPROCATING SAW, Ser. No. 10/856,015, filed May 28, 2004, is specifically incorporated by reference herein.

Figure 1:
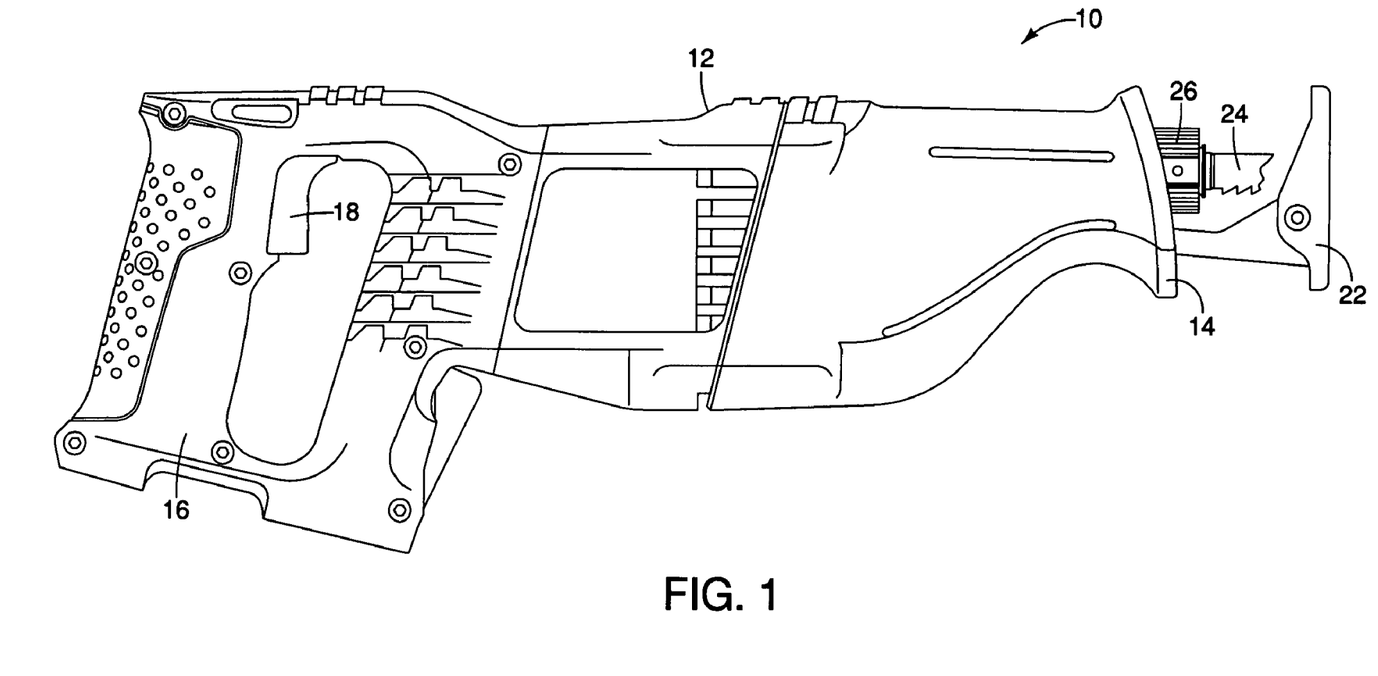
FIG. 1 is a side view of a preferred embodiment of a reciprocating saw of the present invention.
Figure 2:
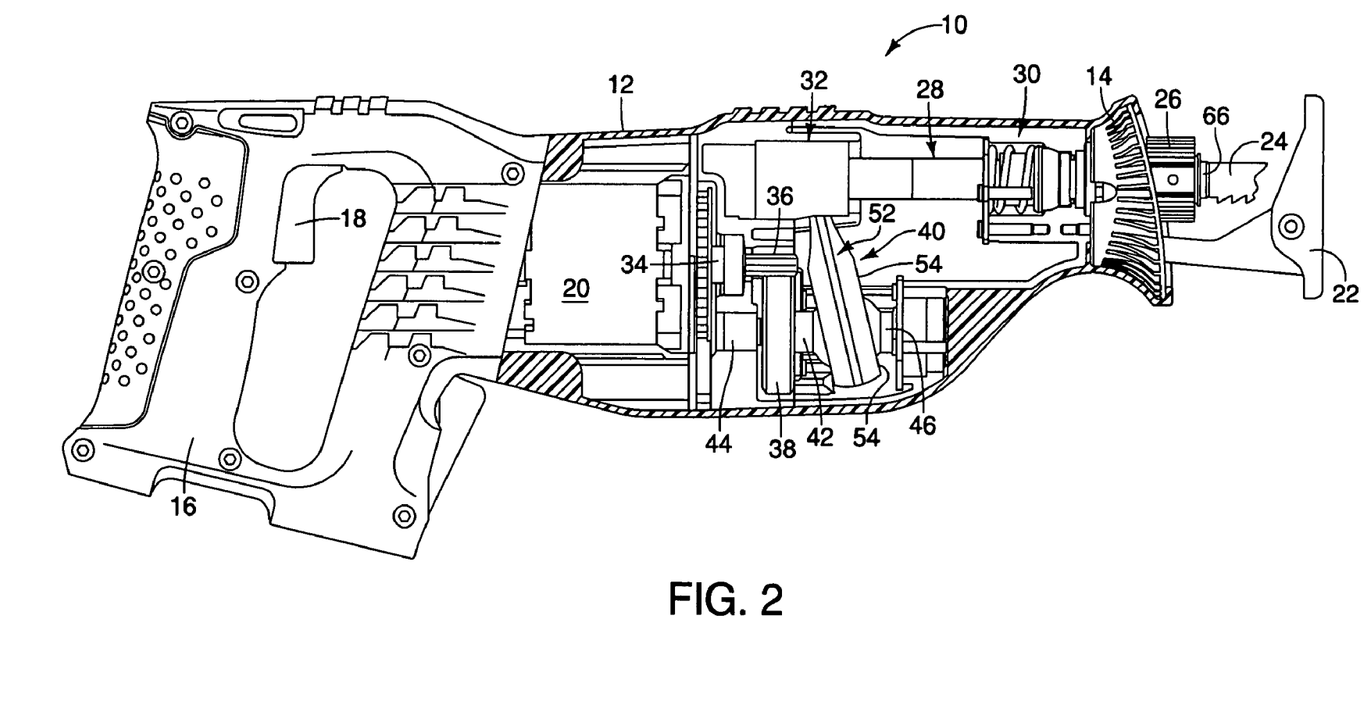
FIG. 2 is a side view of the preferred embodiment of the wobble plate assembly shown in FIG. 1 with portions removed to illustrate interior construction.

As shown in FIGS. 1 and 2, the reciprocating saw, indicated generally at 10, has an outer housing 12 which includes a nose portion 14 that is flared outwardly so that a user can hold the nose portion with one hand while holding a handle 16 with the other. A trigger switch 18 is provided in the handle portion for turning on a motor 20 that drives the tool. The saw has a shoe 22 at the nose end portion 14 and a saw blade 24 is mounted in a blade clamping mechanism 26 that is mounted at the end of an elongated plunger, indicated generally at 28, which is slideable in front and rear bushing assemblies, indicated generally at 30 and 32, respectively. The motor 20 has an output shaft 34 with a pinion gear 36 mounted on the shaft 34, with the gear 36 engaging a larger gear 38 that is connected to a wobble plate assembly, indicated generally at 40, which drives the plunger 28 in a reciprocating manner as the gear 38 drives the wobble shaft assembly.

More particularly, the wobble shaft assembly 40 has a drive shaft indicated generally at 42, to which the gear 38 is attached. The shaft has an end portion 44 that is supported in a ball bearing or the like and its opposite end 46 supported in another ball bearing that is mounted in the housing 12. It should be understood that the manner in which the motor 20, gears 36 and 38 as well as the shaft 42 are mounted in the structure is not in and of itself part of the present invention and the manner in which the housing is constructed and the rotating parts are supported is well known to those of ordinary skill in the art.

Figure 3:
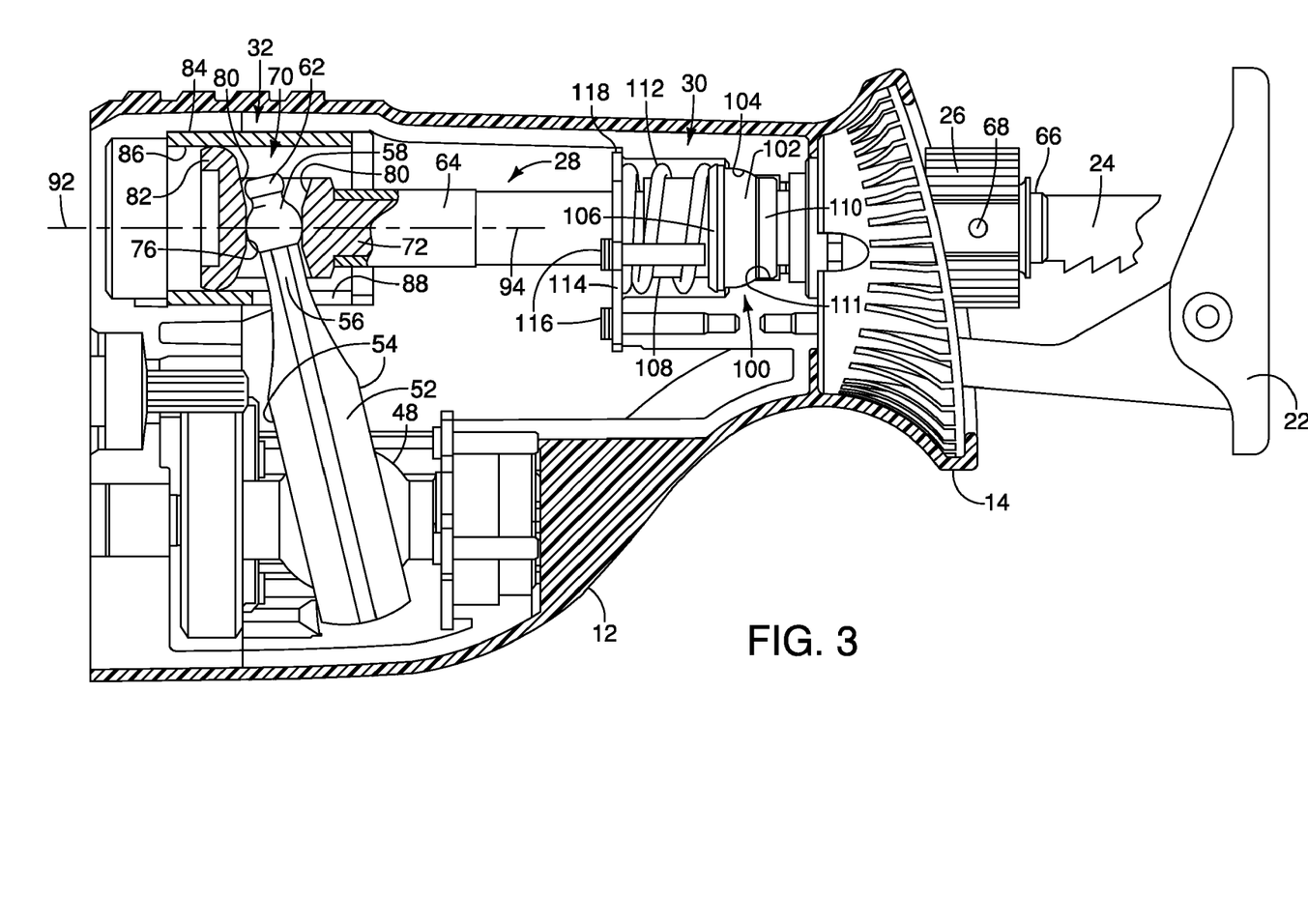
FIG. 3 is an enlarged side view of the interior construction of a front portion of the embodiment shown in FIG. 2.
Figure 4:
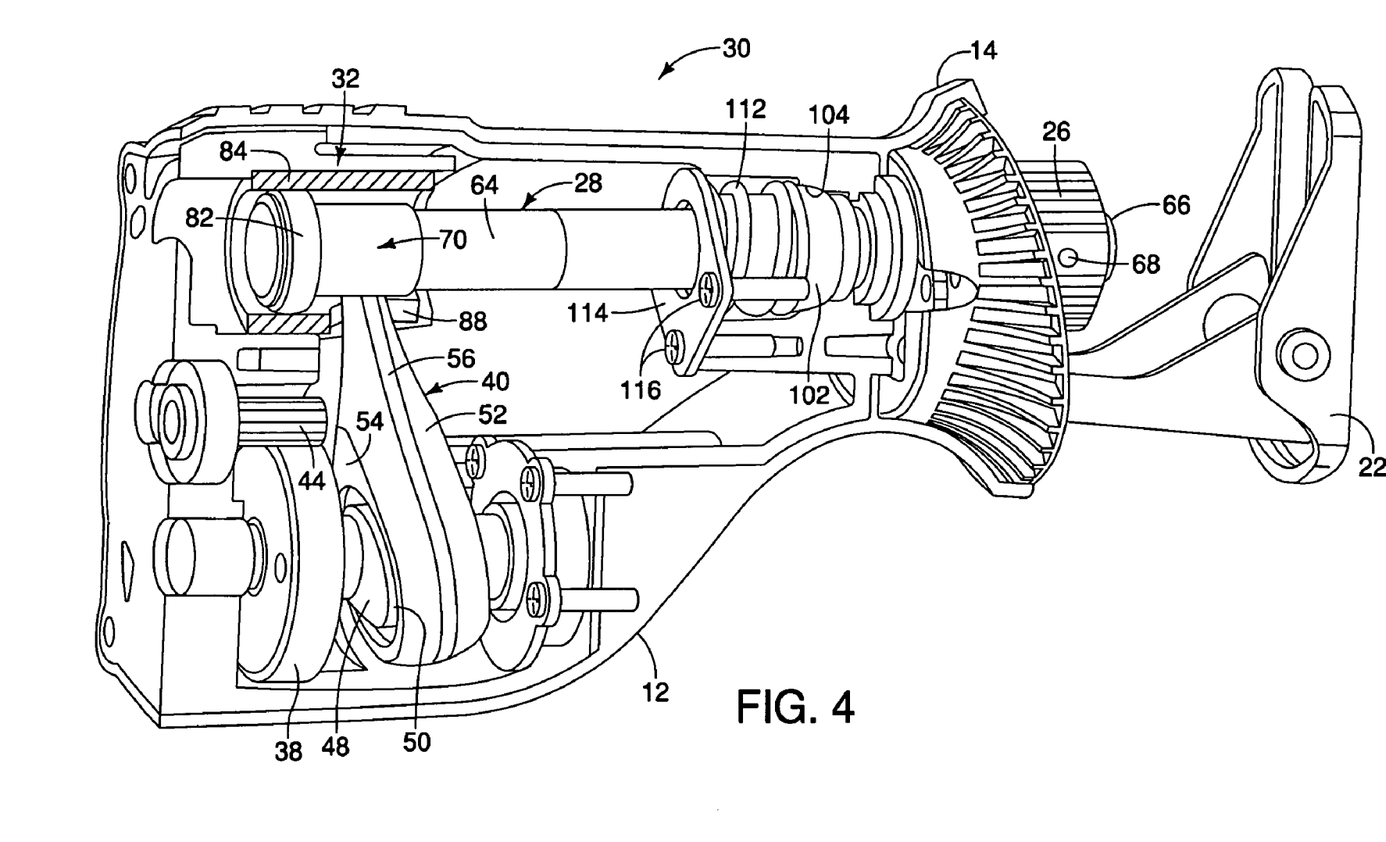
FIG. 4 is a perspective view of the interior construction of the front portion shown in FIG. 3.

With regard to the wobble plate assembly 40 and referring to FIGS. 2 and 4, the shaft 42 has an enlarged center portion 48 of the shaft 42 with a cylindrical shaped portion 50 that is oriented at an acute angle relative to the axis of the shaft 42 and ball bearings (not shown) are positioned to permit an elongated arm 52 to rotate relative to the cylindrical portion 50. As the shaft 42 is rotated, the angular orientation of the cylindrical portion 50 changes so that an outer end 56 of the arm 52 is moved in a reciprocating manner, i.e., to the left and right as contrasted in FIGS. 6 and 7. As is shown in FIGS. 2-5, the arm 52 has generally flat sides 54 that extend from the bottom upwardly toward the outer end 56 which then merges into a curved portion that reduces in size and becomes circular shaped in cross-section. It then merges with a first ball-type interface 58 that in turn merges into a transition portion 60 that in turn merges into a second ball-type interface 62. The interfaces 58 and 62 have a generally spherical form, albeit truncated, where each merges with adjacent structure 56 and/ or 60. It should be understood that these ball-type interface portions do not need to be strictly spherical but are desirably generally near-spherically shaped so that point contact is made between these interfaces and the plunger 28.

Figure 5:
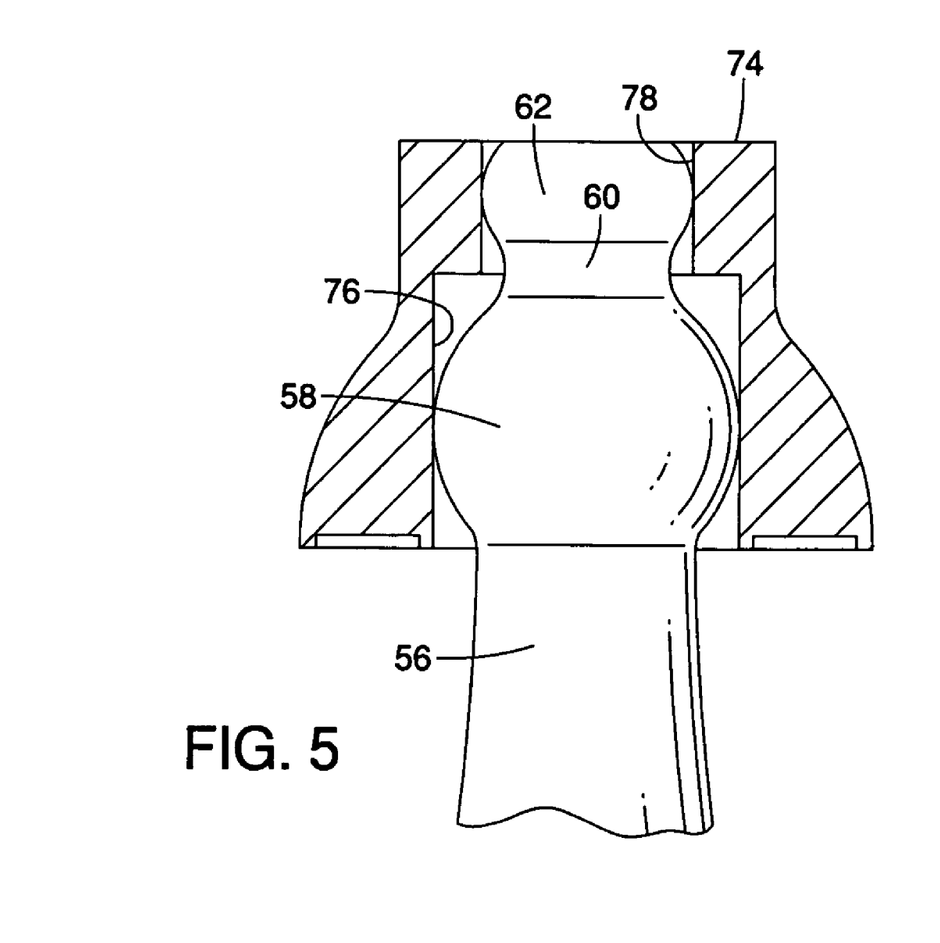
FIG. 5 is an end view of a portion of interior construction of the front portion of the embodiment shown in FIG. 2, shown partially in section.

Referring to FIGS. 3 and 5, the plunger 28 has a tubular portion 64 that merges into a right end solid generally cylindrical section 66 that has a vertical slot (see FIG. 8) in which the shank end of the blade 24 may be inserted. The end 66 also has an aperture 68 in which a pin of the blade clamping mechanism 26 may be attached. At the opposite end of the plunger 28 is a receiver portion, indicated generally at 70, that has a cylindrical extension 72 that is sized to closely fit within the interior of the tube portion 64 and which is also preferably braised to securely hold the two components together inasmuch as extreme forces are incurred by the plunger 28 during operation.

The receiver portion 70 has a main body portion 74 that has a circular opening 76 that merges into an elongated slot 78, the length of which is oriented in the same direction as the axis of the tubular portion 64 as shown in FIGS. 3 and 5. The ends of the slot 78 are flared outwardly as shown at 80 to accommodate the reciprocating motion that is caused by the elongated arm 52 and particularly the ball-type interfaces 58 and 62 that are positioned in the opening 76 and slot 78, respectively. As shown in FIGS. 3 and 5, the first ball-type interface 58 is positioned in the opening 76 with the outside of the interface being generally in a point contact with the sidewall of the opening 76. The second ball-type interface 62 also rides in the slot 78 and as is best shown in FIG. 5, the diameter of the interface 62 is only slightly smaller than the width of the slot 78 and thereby effectively prevents the plunger 28 from rotating out of its vertical plane of movement.

Because of the preferably spherical-shaped configuration of the interfaces 58 and 62 being positioned in the respective opening 76 and slot 78, each of which have straight wall surfaces that are contacted, there is only point contact between the interfaces and the sidewalls during the entire movement of the elongated wobble arm 52. This point contact results in the advantages of reduced wear between the interfaces and the receiver portion 70 and less heat being generated during operation. Also, because of the curvature of the ball interface portions with the vertical walls being contacted, there is only point contact at all times, regardless of the tolerances and clearances between the parts. It is also preferred that grease be applied to the receiver portion 70 to further reduce friction between the ball-type interfaces and the receiver portion 70.

An added advantage is achieved in that the point contact of the placement of the first ball interface 58 in the receiver portion 70 is at a vertical elevation relative to the tube portion 64 that is inside of the tube portion. This contact location applies reciprocating force to move the plunger close to the center of the tubular portion 64 as is desired.

The receiver portion 70 has a spherical rear end portion 82 that is in a slideable relation to a rear bushing 84 that is generally cylindrically shaped and has an inside diameter 86 that is only slightly larger than the outside diameter of the spherical portion 82. The bottom of the bushing 84 has an axial slot 88 that is sized to permit non-contacting movement of the arm 52 with the bushing 84. The use of the spherical end portion 82 does not require critical tolerances of the bushing outside diameter relative to the bushing 84 and therefore reduces manufacturing costs of the assembly 32.

The center axis of the spherical end portion 82 is identified at 92 is preferably concentric with the axis of the tubular portion 64 identified at 94. To prevent any rotational movement along the plunger axes, the wobble plate assembly 40 as well as the plunger is prevented from rotating by the provision of the second ball interface 62. This interaction with the sidewalls of the slot 78 will prevent the arm 52 from rotating out of its vertical plane of reciprocating movement and it also keep the plunger 28 from rotating.

As has been described, the rear end of the plunger 28 is slideably supported in the rear by bushing assembly 32 and the front end is supported by the front bushing assembly 30. As is best shown in FIGS. 3 and 4, the front bushing assembly 30 has a bushing, indicated generally at 100, that includes a spherical front portion 102 that engages a spherically shaped cavity or seat 104 that is formed in the housing. The spherical portion 102 is free to rotate about the axis 94 of the tubular portion under the influence of forces that may be applied during operation of the tool.

The bushing 100 has an annular shoulder 106, a smaller diameter cylindrical portion 108 that is larger than the tubular portion 64 and a front cylindrical portion 110. Each of the bushing portions 102, 106, 108 and 110 have an opening through which the tubular portion 64 can pass so that the reciprocation of the plunger 28 can occur. The cylindrical front portion 110 is sized to easily fit within a larger chamber 111 in the housing when the spherical portion 102 is seated in the cavity 104. A spring 112 bears against the shoulder 106 and against a retaining plate 114 that is attached to the housing 12 by bolts 116 in cooperation with a shoulder 118 formed in the housing. There are preferably three bolts 116, with two being visible in FIGS. 3 and 4, the third being on the other side of the tubular portion 64 at the same elevation as the upper visible bolt 116. It is preferred that the bushing 100 with its component parts 102, 104, 106, 108 and 110 be one piece construction, and be made of steel or other low friction metal. However it should be understood that one or more of the components may be separately fabricated if desired.

The spring 112 provides a biasing force for maintaining the spherical front portion 102 in contact with the spherical seat 104 but not with such force that the bushing is prevented from rotating around axis 94 during operation. It has been found that this floating interaction permits the bushing to move and align itself in a manner that reduces forces that are generally applied to it during operation of the tool. Such rotating movement contributes to an extended useful life and also produces less heat during operation. The reduction in heat that is generated during operation also contributes to an extended useful life of the tool. It is preferred that grease be packed in the volume where the front bushing assembly 30 is located.

Figure 6:
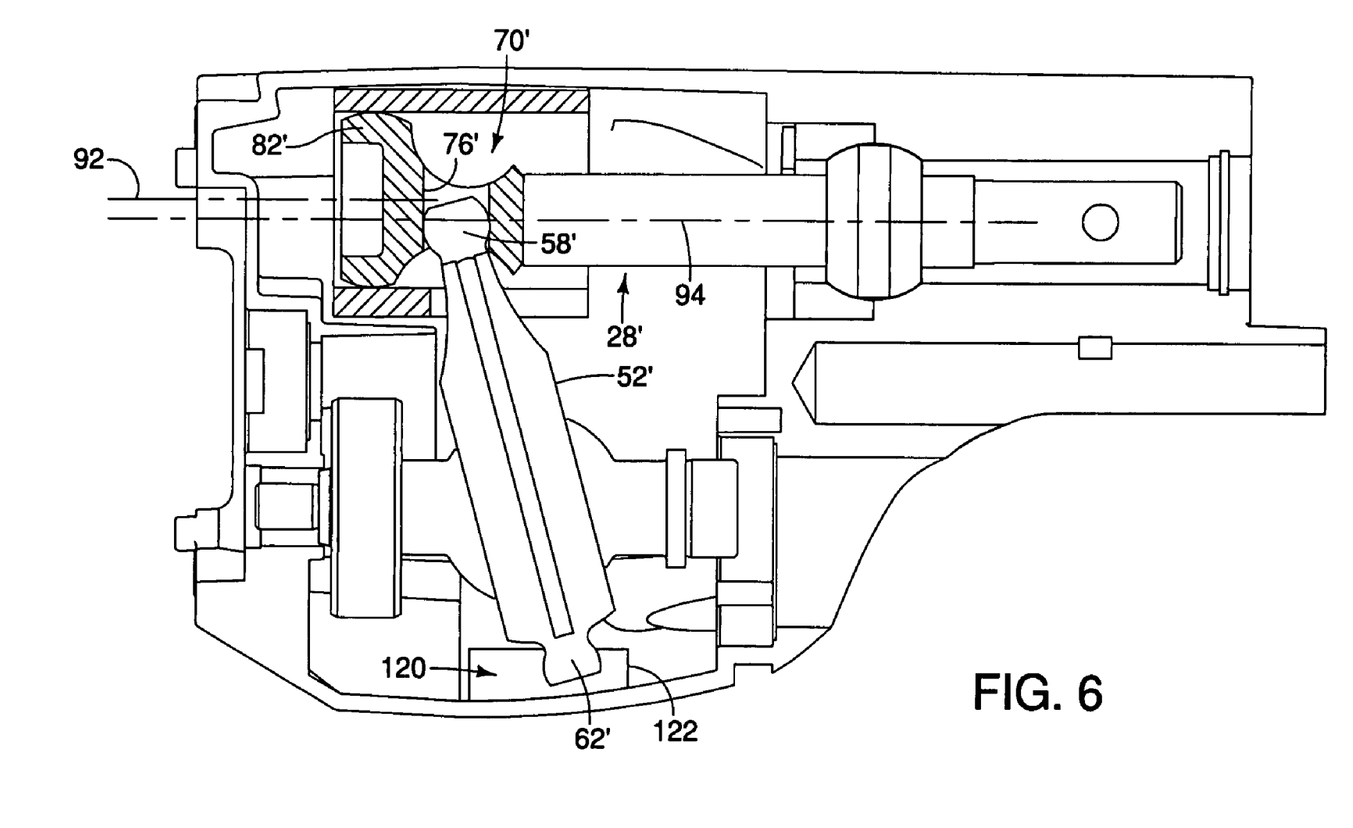
FIG. 6 is a side view of the interior construction of the front portion of an alternative preferred embodiment, shown partially in section and with the plunger in the retracted position.
Figure 7:
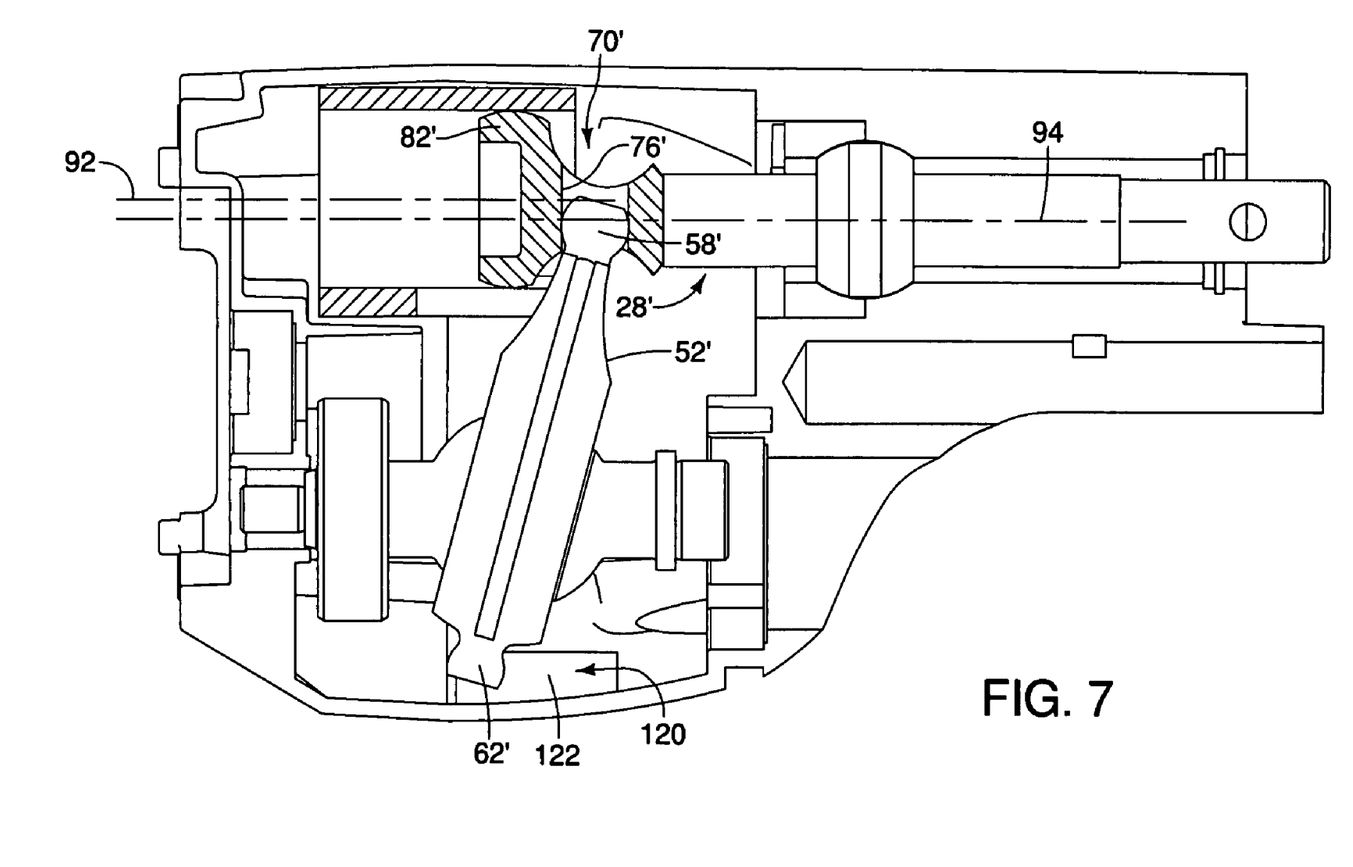
FIG. 7 is another side view of the interior construction of the front portion of the alternative preferred embodiment, shown partially in section and with the plunger in the extended position.
Figure 8:
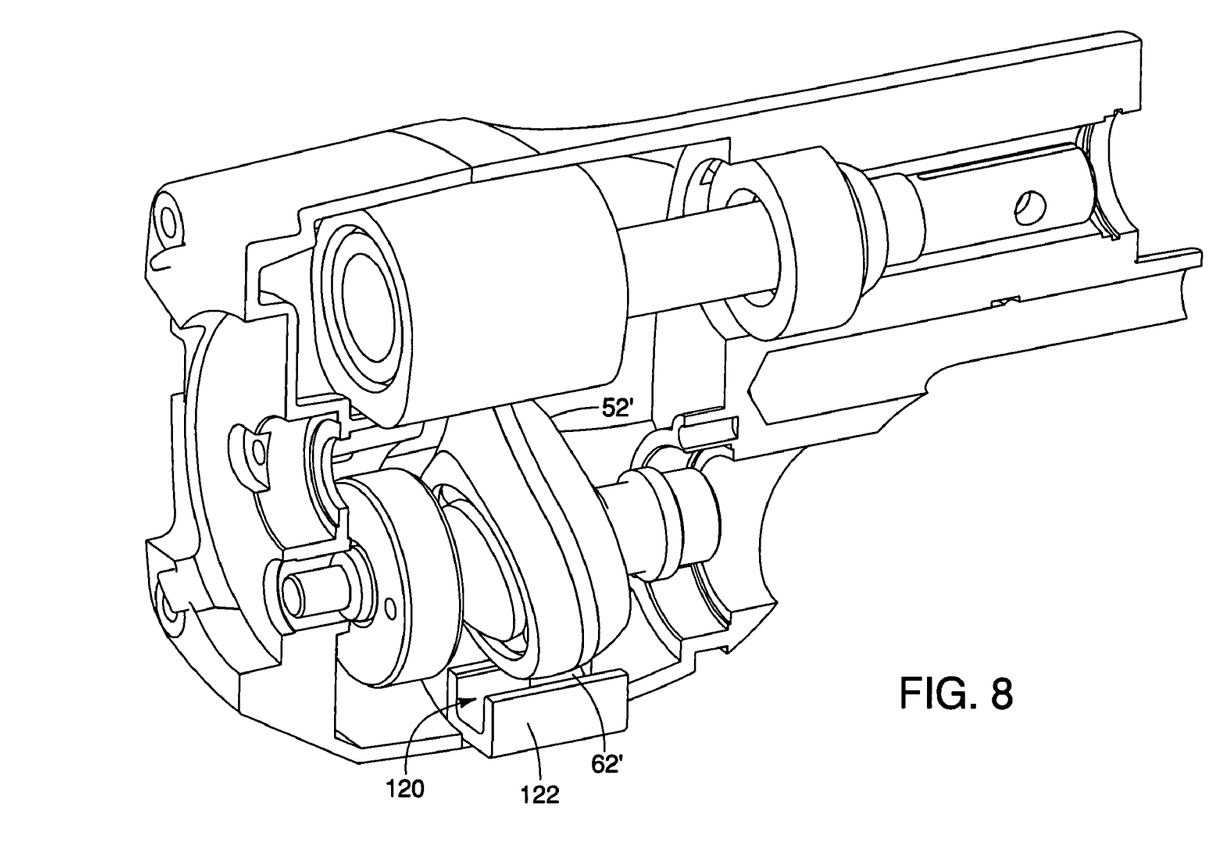
FIG. 8 is a perspective view of the interior construction of the front portion of the alternative preferred embodiment, shown partially in section and with the plunger in the retracted position.

An alternative embodiment is shown in FIGS. 6, 7 and 8, and is illustrated in a less detailed manner than FIGS. 1-5 that illustrate the preferred embodiment. The alternative embodiment shown in these drawings includes modification of the receiver portion 70' that has a slightly different configuration to accommodate the ball-type interface 58'. The circular opening 76' does not have an upper slot area and in fact, the second ball-type interface 62' is located at the bottom of the arm 52', the ball-type interface 62' riding in a slot 120 of a U-shaped bracket 122. The width of the slot is only slightly greater than the outside diameter of the ball-type interface 62' and acts to maintain the reciprocating movement of the arm 52" its vertical plane, in a manner similar to the second ball-type interface 62 of the preferred embodiment.

The center axis of the spherical end portion 82' is identified at 92 and the axis of the tubular portion 64 is identified at 94. The axis 92 is offset relative to the axis 94 in a vertical plane to compensate for the tendency of the plunger 28' to rotate along the axis of the plunger system due to inertia of the mechanism. To prevent this rotational movement along the plunger axes, the spherical end portion 82' is offset relative to the tubular portion axis 94 which effectively restricts the plunger 28' from rotating. The other parts of this embodiment are substantially similar to the preferred embodiment and therefore have not been given reference numbers.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A reciprocating drive apparatus comprising;
   a housing;
   a drive shaft rotatably mounted in said housing;
   an elongated plunger mounted in said housing for reciprocating motion; said plunger having a rear end portion configured to engage a wobble plate interface structure and a cylindrically shaped front end portion with a first center axis for attaching a tool;
   a first bushing positioned in said housing for retaining said front end portion in a manner whereby said plunger is not restrained from rotating about a first axis of rotation;
   a second bushing positioned in said housing for receiving said rear end portion of said elongated plunger, said rear end portion having a circular outer surface and a second center axis and being configured to contact said second bushing during reciprocation of said plunger in said bushing;
   a wobble plate assembly operatively connected to said drive shaft and having an elongated arm with a wobble plate interface structure for engaging said rear end portion of said plunger and reciprocating said plunger in said first and second bushings;
   wherein said first and second center axes are offset relative to one another.

2. A reciprocating drive apparatus as defined in claim 1 wherein the front end portion of said plunger that reciprocates in said first bushing has a cylindrical configuration and said first axis is the axis of said cylindrical configuration.

3. A reciprocating drive apparatus as defined in claim 1 where said rear end portion having a circular outer surface that reciprocates in said second bushing, said second bushing being cylindrically shaped and fixed in said housing, said second axis being the coextensive with the axis of said cylindrically shaped second bushing.

4. A reciprocating drive apparatus as defined in claim 2 wherein said housing has a spherically shaped cavity surrounding an opening in which said front end portion of said plunger is located, said first bushing having a spherically shaped outer surface configured to mate with said cavity and be movable therein, said apparatus further comprising a spring in said housing configured to bias said first bushing into contact with said cavity, said first bushing being capable of reacting to forces applied to said front end portion of said plunger to move within said cavity and achieve self-alignment.

5. A reciprocating drive apparatus as defined in claim 1 wherein said interface structure comprises first and second ball-type interfaces concentrically aligned with one another, said first interface causing reciprocating motion of said plunger and said second interface preventing rotation of said plunger.

6. A reciprocating drive apparatus as defined in claim 5 wherein said first ball-type interface has a larger circumference than said second ball-type interface.

7. A reciprocating drive apparatus as defined in claim 6 wherein said second interface is located adjacent said first ball-type interface at the outer upper end of said wobble plate assembly.

8. A reciprocating drive apparatus as defined in claim 7 wherein said first ball-type interface comprises a generally spherically shaped portion that merges with said arm at one end thereof and merges with said second ball-type interface at the opposite end thereof.

9. A reciprocating drive apparatus as defined in claim 5 wherein said second interface is located at an outer lower end of said wobble plate assembly.

10. A reciprocating drive apparatus comprising;
    a housing;
    a drive shaft rotatably mounted in said housing;
    an elongated plunger mounted in said housing for reciprocating motion; said plunger having a rear end portion configured to be coupled to a wobble plate interface structure and a cylindrical front end portion to which a tool can be operatively attached, said cylindrical front end portion having a center axis;
    a floating bushing retained in said housing and having an opening in which said cylindrical front end portion can reciprocate, said floating bushing being capable of limited movement responsive to forces being applied to said front end portion to thereby facilitate stress relieving realignment of said front end portion tending to reduce heat generation and to extend the useful life of said apparatus, wherein said housing has a spherically shaped cavity surrounding said opening, said floating bushing having a spherically shaped outer surface configured to fit within said cavity and be rotatably movable therein and movable in an axial direction away from said cavity, said apparatus further comprising a spring in said housing configured to bias said floating bushing into contact with said cavity;
    a rear bushing having a cylindrical axis positioned in said housing for receiving said rear end portion of said elongated plunger, said plunger being configured to reciprocate in said rear bushing;
    a wobble plate assembly operatively connected to said drive shaft and having an elongated arm with a wobble plate interface structure for engaging said rear end portion of said plunger and reciprocating said plunger in said first and second bushings;
    wherein said center axis of said cylindrical front end portion is offset relative to said cylindrical axis of said rear bushing.

11. A reciprocating drive apparatus as defined in claim 10 wherein said rear end portion has a generally spherical portion that reciprocates in said rear bushing, said rear bushing being cylindrically shaped and fixed in said housing.

12. A reciprocating drive apparatus as defined in claim 11 wherein said spherical portion permits said plunger to have limited rotational movement relative to said housing.

13. A reciprocating drive apparatus as defined in claim 10 wherein said interface structure comprises first and second ball-type interfaces concentrically aligned with one another, said first interface causing reciprocating motion of said plunger and said second interface preventing rotation of said plunger.

14. A reciprocating drive apparatus as defined in claim 13 wherein said first ball-type interface has a larger circumference than said second ball-type interface.

15. A reciprocating drive apparatus as defined in claim 14 wherein said second interface is located adjacent said first ball-type interface at the outer upper end of said wobble plate assembly.

16. A reciprocating drive apparatus as defined in claim 14 wherein said first ball-type interface comprises a generally spherically shaped portion that merges with said arm at one end thereof and merges with said second ball-type interface at the opposite end thereof.

17. A reciprocating drive apparatus as defined in claim 13 wherein said second interface is located at an outer lower end of said wobble plate assembly.

* * * * *